Feb. 5, 1963 J. R. WILHELM 3,076,550
THROWAWAY LIQUID FILTER
Filed Aug. 24, 1959

INVENTOR.
JOHN R. WILHELM
BY Lawrence J. Winter
ATTORNEY

United States Patent Office 3,076,550
Patented Feb. 5, 1963

3,076,550
THROWAWAY LIQUID FILTER
John R. Wilhelm, Perth Amboy, N.J., assignor to Purolator Products, Inc., Rahway, N.J., a corporation of Delaware
Filed Aug. 24, 1959, Ser. No. 835,762
4 Claims. (Cl. 210—232)

The present invention relates to a liquid filter and more particularly to a filter used in connection with an internal combustion engine, although it is apparent that it may have many other uses.

An object of the present invention is to provide a compact and economic filter disposed in the liquid line that supplies fuel to the engine, for example in the copper or brass tubing leading from a fuel storage tank to the carburetor of an internal combustion engine, which filter may be readily discarded and replaced with a clean cartridge when it becomes clogged, without disturbing the permanent tubing or equipment with which it is associated.

Another object of the present invention is to provide a fuel filter for use in a fuel line leading to the carburetor of an internal combustion engine in which the filter may be easily removed and discarded when clogged by unthreading the portion of the filter containing the used cartridge without disturbing the remaining portion of the unit or disconnecting any other parts.

Another object of the present invention is to provide a compact lightweight fuel filter having an inner casing or cup member disposed therein and one in which the dirty filter may be detached without requiring any special tools or involving handling of the dirty filter element.

Another object of the present invention is to provide a lightweight, inexpensive screw-on throwaway fuel filter that may be readily replaced without disconnecting any of the permanent fuel lines with which it is used.

Figure 1:
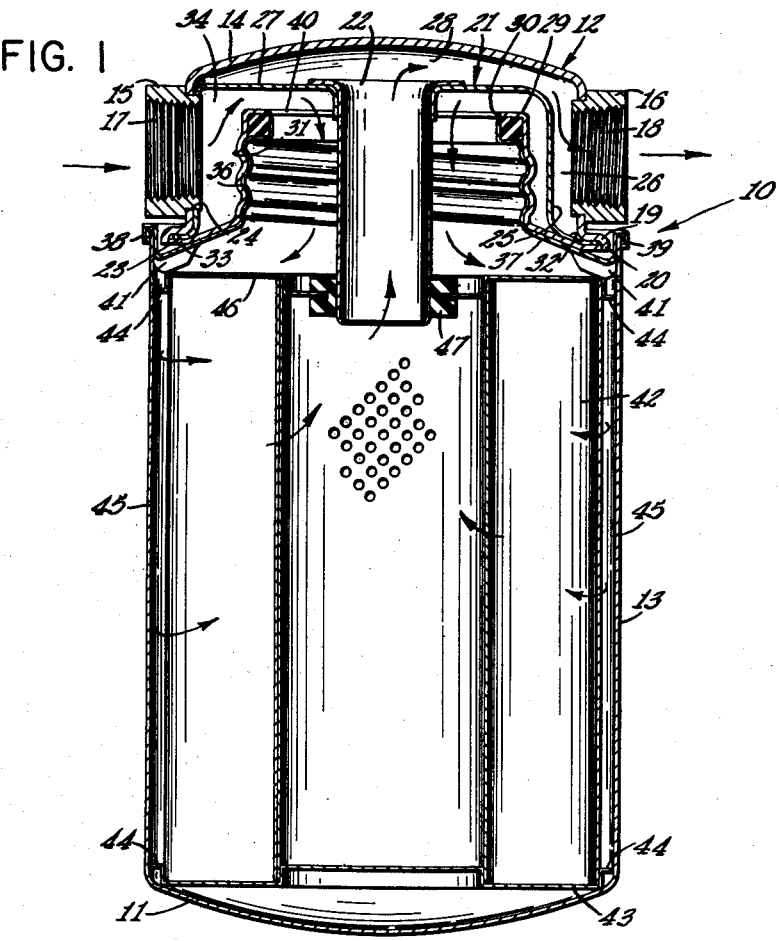
Figure 2:
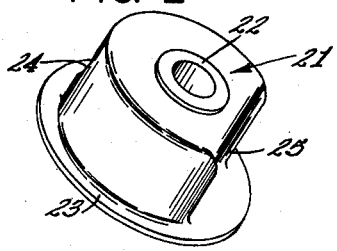

Various other objects of the present invention will be readily apparent from the following description when considered in connection with the accompanying drawing forming a part thereof and in which FIG. 1 is a side sectional view of the filter embodying the present invention, and FIG. 2 is a perspective detail view of the inner casing disposed in the filter of the present invention.

Referring to the drawings the reference numeral 10 designates a cylindrical filter shell or housing made of thin sheet metal with a rounded bottom portion 11 and rounded top 12. The bottom 11 of the shell is formed integrally with the cylindrical shell sidewall 13 while the filter head 14 is formed separately from the shell. The head 14 is an inverted open cup shaped member having internally threaded bosses 15 and 16 disposed in alignment in its opposite sides to provide a fuel inlet port 17 and outlet port 18 therein. The lower end of head 14 is provided with a horizontal rim 19 having a downwardly extending lip 20 therein.

An inner cylindrical casing or cup 21 is disposed in head 14, with a centrally located tube 22 secured to its top by spot welding and extending to a point below the lower edges of the casing and head 14. The open lower end of the casing has a horizontal lip 23 which seats against lip 19 of the head to which it is secured by brazing. One side of casing 21 has a circular opening 24 through which boss 15 extends. The casing is brazed to boss 15 to provide a fluid tight joint therewith. The portion of the casing directly opposite 24 is indented or provided with a flat or straight wall portion 25 so that the portion of head 14 adjacent thereto is spaced from the wall portion to define a discharge chamber or passage 26 therebetween. The remaining portion of the casing forms a press fit with the inner surface of head 14 while the flat top 27 of the casing is spaced from the rounded portion 12 of the head so that a chamber 28 is formed therebetween in communication with chamber 26 and center tube 22.

The inner casing is assembled in the head by first spot welding tube 22 thereto and then inserting the casing within head 14 and brazing boss 15 thereto.

Disposed within the inner casing in spaced relationship therewith is a threaded cylindrical adapter member 29 made of thin sheet metal having a central opening 30 in the top and internal threads 31 in the side thereof. The lower end of member 29 has a downwardly and outwardly inclined portion 32 and terminates in a horizontal lip or flange 33 seated against lip 23 of the inner casing to which it is secured by brazing. Member 29 is positioned in spaced relationship with the top 27 of the inner casing as well as the side so that an inlet chamber 34 is provided therebetween for incoming liquid to be filtered entering through port 17.

Member 29 is adapted to receive the externally threaded neck 36 of the filter body 13. Neck 36 has a downwardly and outwardly extending portion 37 which corresponds to portion 32 of the threaded adapter member against which it seats, and terminates in a lip portion 38 rolled over a corresponding lip 39 on the upper end of the filter shell to form a lock seam. The upper edge of neck 36 has a vertical lip 40 which acts as a stop against the top of threaded member 29 when the filter body is securely threaded therein. Portion 37 of the neck has spaced detents 41 formed therein against which the filter element seats.

A conventional annular resin impregnated pleated filter element 42 is disposed in the filter body 13 and has its lower circular end closure or cap 43 seated against the rounded portion 11 of the filter shell. End cap 43 has spaced horizontal tongues 44 which maintain the filter element positioned concentrically in the shell so that an annular chamber 45 is provided between the outer side of the filter element and the inner surface of the casing wall. The upper annular end cap 46 is also provided with similar tongues 44 and seats against the detents 41 projecting from the neck. The inner periphery of end cap 46 is provided with resilient ring gasket 47 adapted to fit on center tube 22 to provide a seal therebetween.

In operation, the filter of the present invention is disposed in the tubing comprising the fuel supply line to the carburetor of an internal combustion engine by conventional connecting fixtures so that incoming fuel enters port 17, passes through chamber 34 around the outside of the threaded adapter member 29 and through port 30 into the filter body proper. Thereafter the incoming fuel flows in to annular chamber 45 and passes in an outside-in direction through the filter element and is discharged through center tube 22 and chambers 28 and 26 passing out of the filter through outlet port 18 to the carburetor.

When the filter becomes clogged it is only necessary to unthread the filter shell 13 from the threaded adapter member 29 and replace the dirty filter element with a new filter cartridge.

Thus it is apparent the present invention provides a throwaway type of filter cartridge for the fuel system of an internal combustion engine which does not require any disturbance of the filter head or connecting fuel lines with which it is used.

Inasmuch as various changes may be made in the particular form and arrangement of the article as disclosed without departing from the principles of the invention, it will be understood that the invention is not to be limited except by the scope of the appended claims.

What is claimed is:

1. A filter comprising an open end cylindrical filter shell and filter head, said head having laterally disposed threaded bosses therein providing an inlet and outlet for passing liquid to be filtered therethrough, an inner cylindrical casing in said head having an open bottom with its top spaced from the inner top surface of the head and a straight portion in its side spaced from the side of said head to define an inlet and an outlet chamber in said head adjacent said inlet and outlet respectively, a central opening in top of said casing, a tube extending through said opening and secured to said casing, said tube extending below the lower edge of said casing, a cylindrical internally threaded adapter member in said casing spaced from the inner surface thereof disposed about said tube and having an inlet port around said tube, the lower portion of said member being outwardly inclined and terminating in a horizontal lip secured to said casing, a cylindrical externally threaded neck closing off the open end of said filter shell adapted to be threaded into said member, and a filter cartridge disposed in said shell to receive contaminated liquid from said inlet port and to discharge clean liquid into said tube.

2. A filter comprising an open end cylindrical filter shell, an open end cup shaped head having a horizontal lip adjacent its open end, laterally disposed threaded bosses in the opposite sides of said head providing an inlet and outlet for passing fuel to be filtered therethrough, a cylindrical open end casing in said head having an outwardly inclined portion adjacent its open end terminating in a horizontal lip secured to said head lip, the top of said casing being spaced from the closed end of said head, a flat portion provided in the side of said casing opposite said outlet and spaced therefrom to define an outlet chamber with said spaced closed ends, said casing having an opening in the side thereof opposite said outlet, said inlet boss extending through said opening and secured to the casing around said opening, a center tube extending through the casing and secured to the top thereof, said tube extending below the open ends of said casing and head, an internally threaded cylindrical adapter member disposed in said casing spaced from the inner surface thereof, the lower end of said member being provided with an outwardly inclined portion abutting said outwardly inclined casing portion and terminating in a horizontal lip secured to said casing lip, said member having a central opening in the top thereof through which said center tube extends, an externally threaded cylindrical neck secured to the open end of said filter shell adapted to engage said threaded member to connect the filter shell to said head, and a filter cartridge enclosed in said shell to receive contaminated fuel from said central opening and to discharge clean fuel into said tube.

3. A filter comprising a filter shell and a cup shaped head, said head having a laterally disposed inlet and outlet therein for passing liquid therethrough, an inner cup member disposed in said head in spaced relationship with the closed end of said head and adjacent said outlet to form an outlet chamber, said cup member having a central opening and an inlet therein in alignment with said head inlet, a tube extending through said opening, a threaded cylindrical adapter member disposed within said cup member around said tube in spaced relationship with said cup member to form an inlet chamber adjacent said inlets, the lower end of said adapter member having an outwardly extending peripheral flange secured to said cup member, an annular filter cartridge in said filter shell, a neck member closing off one end of said shell permanently enclosing said cartridge therein, said neck member being threaded into said adapter member, and a gasket member on said cartridge through which said tube extends for passing liquid therethrough to said outlet chamber.

4. A filter comprising a cylindrical filter shell and a cup shaped head, said head having a laterally disposed inlet and outlet therein for passing liquid therethrough, an inner cup member disposed in said head in spaced relationship with the closed end of said head and adjacent said outlet to form an outlet chamber, said cup member having a central opening and an inlet therein in alignment with said head inlet, a tube extending through said opening, a threaded cylindrical adapter member disposed within said cup member around said tube in spaced relationship with said cup member to form an inlet chamber adjacent said inlets, the lower end of said adapter member having an outwardly extending flange secured to said cup member, an annular filter cartridge in said filter shell, a neck member closing off one end of said shell permanently enclosing said cartridge therein, said neck member being threaded into said adapter member, the lower portion of said neck member extending outwardly adjacent said lower end of the adapter member and seated thereagainst, and a gasket member on said cartridge through which said tube extends for passing liquid therethrough to said outlet chamber.

References Cited in the file of this patent
UNITED STATES PATENTS

| | | |
|---|---|---|
| 2,031,936 | Cuno | Feb. 25, 1936 |
| 2,203,668 | Burckhalter | June 11, 1940 |
| 2,287,982 | Frudden | June 30, 1942 |
| 2,331,961 | Clark | Oct. 19, 1943 |
| 2,462,943 | Campbell | Mar. 1, 1949 |
| 2,622,738 | Kovacs | Dec. 23, 1952 |
| 2,753,047 | Kettlewell | July 3, 1956 |
| 2,758,719 | Line | Aug. 14, 1956 |
| 2,902,162 | Humbert et al. | Sept. 1, 1959 |